(12) United States Patent
Rowan

(10) Patent No.: US 7,266,932 B2
(45) Date of Patent: *Sep. 11, 2007

(54) FURNITURE FRAMING ASSEMBLY AND METHOD OF USE

(75) Inventor: Thomas J. Rowan, Littleton, CO (US)

(73) Assignee: Mio Lotta, LLC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/461,350

(22) Filed: Jul. 31, 2006

(65) Prior Publication Data

US 2006/0260258 A1    Nov. 23, 2006

Related U.S. Application Data

(63) Continuation of application No. 10/796,684, filed on Mar. 8, 2004, now Pat. No. 7,082,734.

(60) Provisional application No. 60/452,851, filed on Mar. 7, 2003.

(51) Int. Cl.
    *E04C 2/38*      (2006.01)
(52) U.S. Cl. .................. 52/656.1; 52/653.1; 52/656.9; 403/230; 403/231
(58) Field of Classification Search ............... 52/656.1, 52/653.1, 651.1, 656.9; 211/182; 108/180, 108/153.1; 403/230, 231, 240, 10, 396; 256/65.04, 256/65.05
    See application file for complete search history.

(56) References Cited

U.S. PATENT DOCUMENTS 3,353,852 A * 11/1967 Wood .......................... 403/189
3,722,701 A * 3/1973 Malcik et al. ............... 211/194
3,837,754 A * 9/1974 Malcik ........................ 403/217
3,864,051 A * 2/1975 Reid ......................... 403/408.1
3,886,604 A * 6/1975 Ewing ................................ 5/8
4,435,103 A * 3/1984 Becker et al. ............... 403/292
5,169,258 A * 12/1992 Raynak ....................... 403/170
5,411,153 A * 5/1995 Unfried ....................... 211/188

(Continued)

OTHER PUBLICATIONS

Written Opinion of the International Searching Authority relating to International Application No. PCT/US04/07349.

(Continued)

*Primary Examiner*—Carl D. Friedman
*Assistant Examiner*—Chi Q. Nguyen
(74) *Attorney, Agent, or Firm*—Sheridan Ross P.C.

(57) ABSTRACT

The present invention provides a furniture assembly that includes rods and connection members, and that can be fully assembled without using tools or additional hardware. In one embodiment, the rods include a threaded end and an unthreaded end, and the connection members include an interior member and an exterior member, where the interior member and exterior member may be separate or of unitary construction. The exterior member includes unthreaded apertures for receiving the rods and the interior member includes an unthreaded aperture and a threaded aperture, also for receiving the rods. The rods and connection members are interconnected and gradually tightened to provide a stable furniture frame. Multi-level framing and methods of assembly are also provided. In an alternate embodiment, a connector assembly is provided for securing a plurality of rods within a connector using a leg threaded into the connector obliquely to a plane occupied by the rods.

13 Claims, 6 Drawing Sheets

U.S. PATENT DOCUMENTS

| | | | | |
|---|---|---|---|---|
| 5,536,097 A | * | 7/1996 | Hazan | 403/171 |
| 6,183,167 B1 | * | 2/2001 | Ruiz et al. | 405/251 |
| 6,276,698 B1 | * | 8/2001 | Calandra | 280/19 |
| 6,817,478 B2 | * | 11/2004 | Venegas, Jr. | 211/189 |
| 7,082,734 B2 | * | 8/2006 | Rowan | 52/656.1 |

OTHER PUBLICATIONS

International Search Report relating to International Application No. PCT/US04/07349.

* cited by examiner

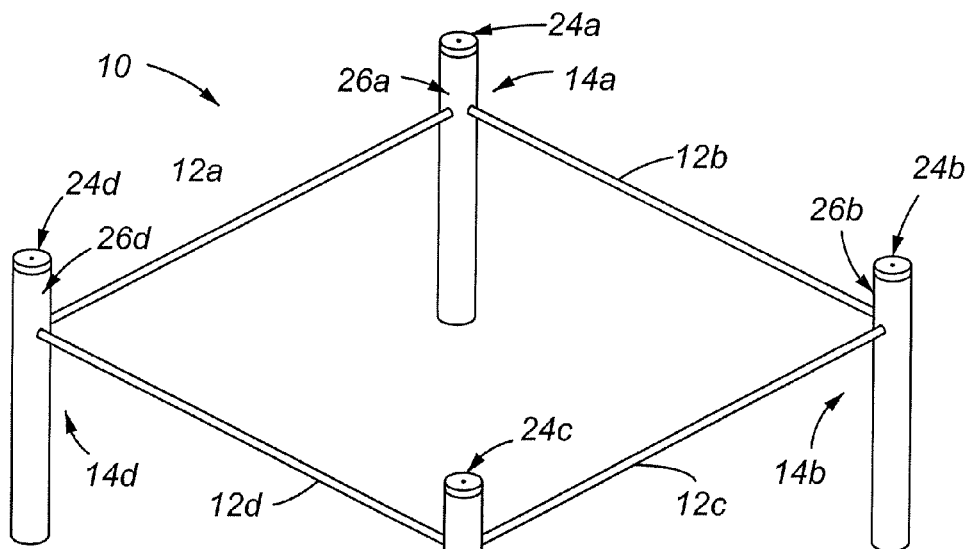
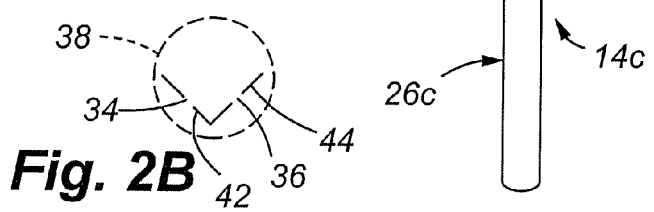
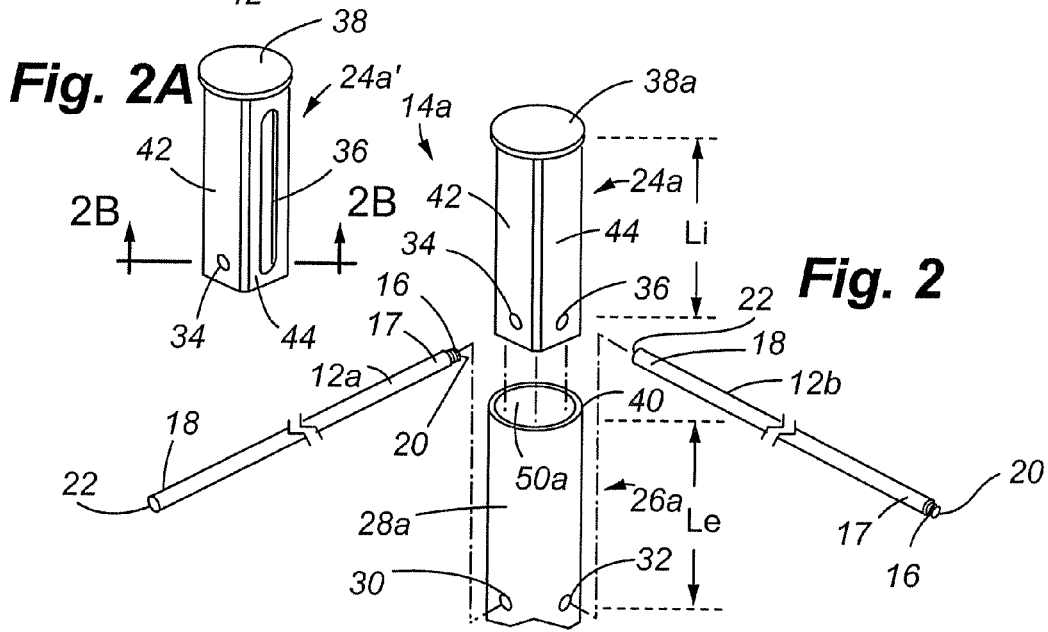

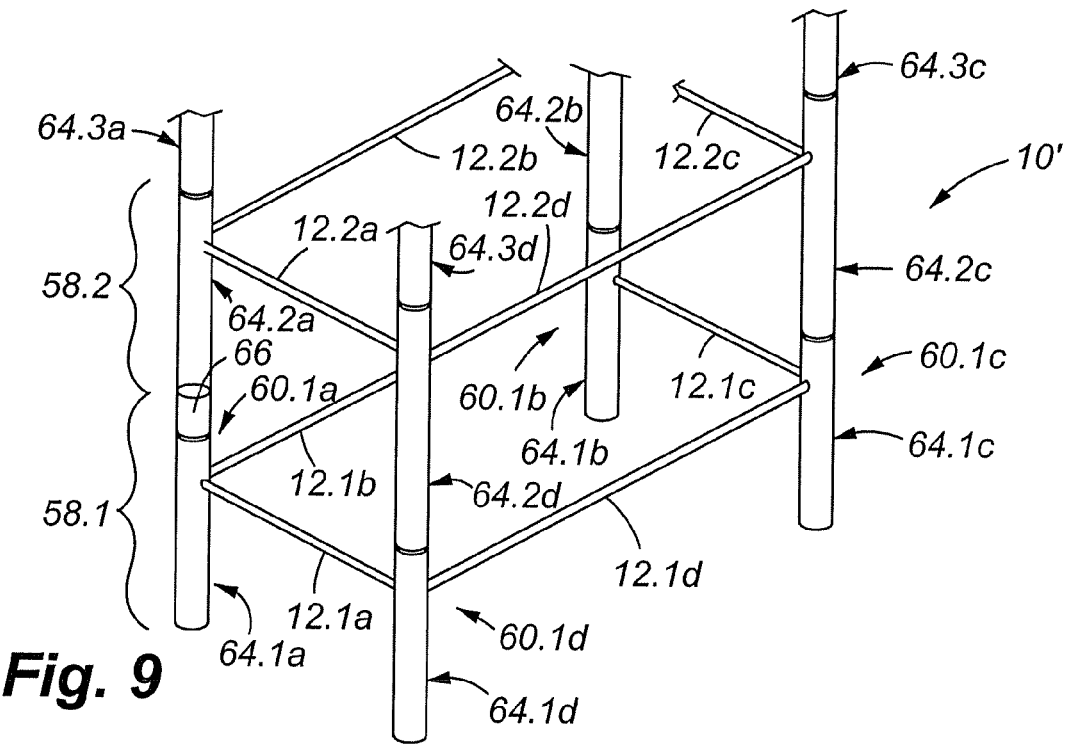
Fig. 9
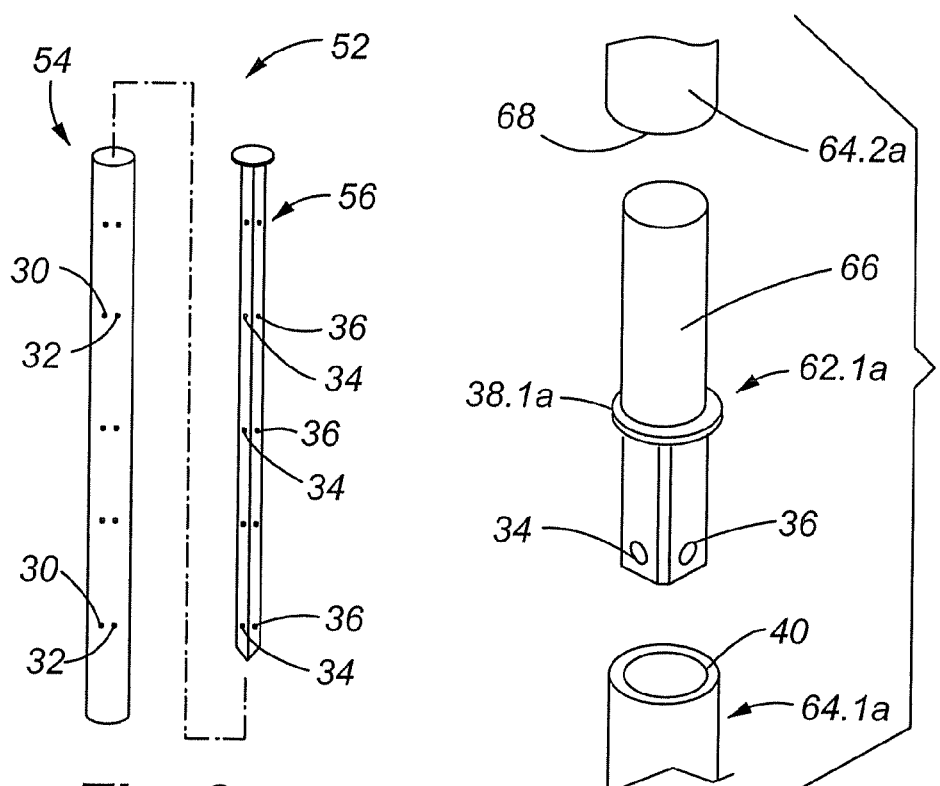
Fig. 8
Fig. 10

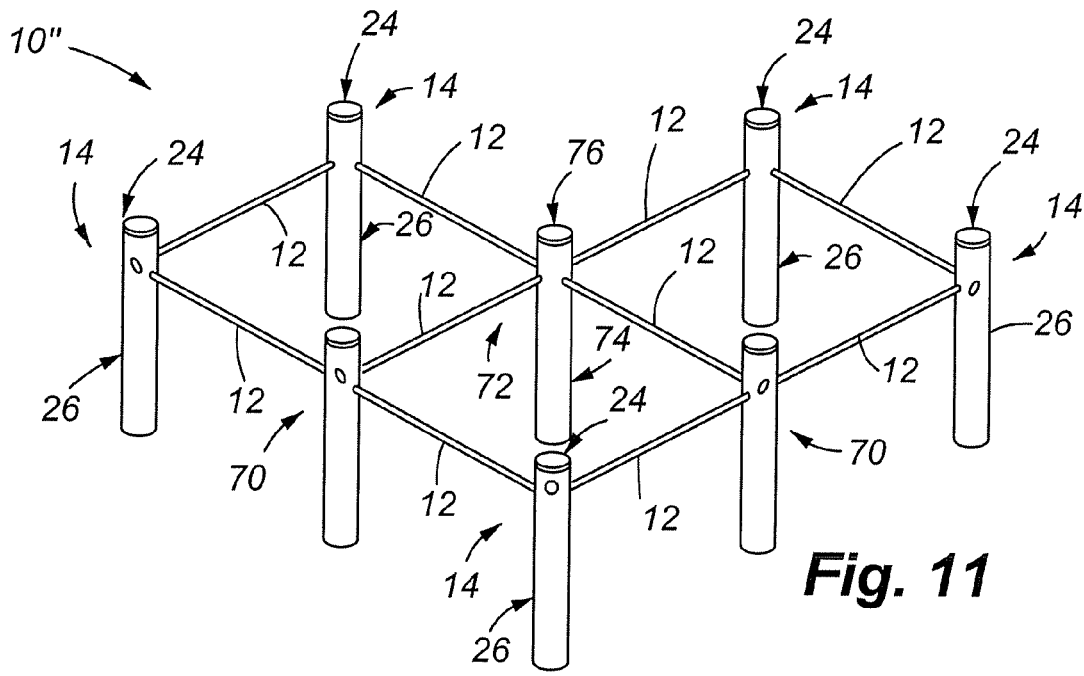
Fig. 11
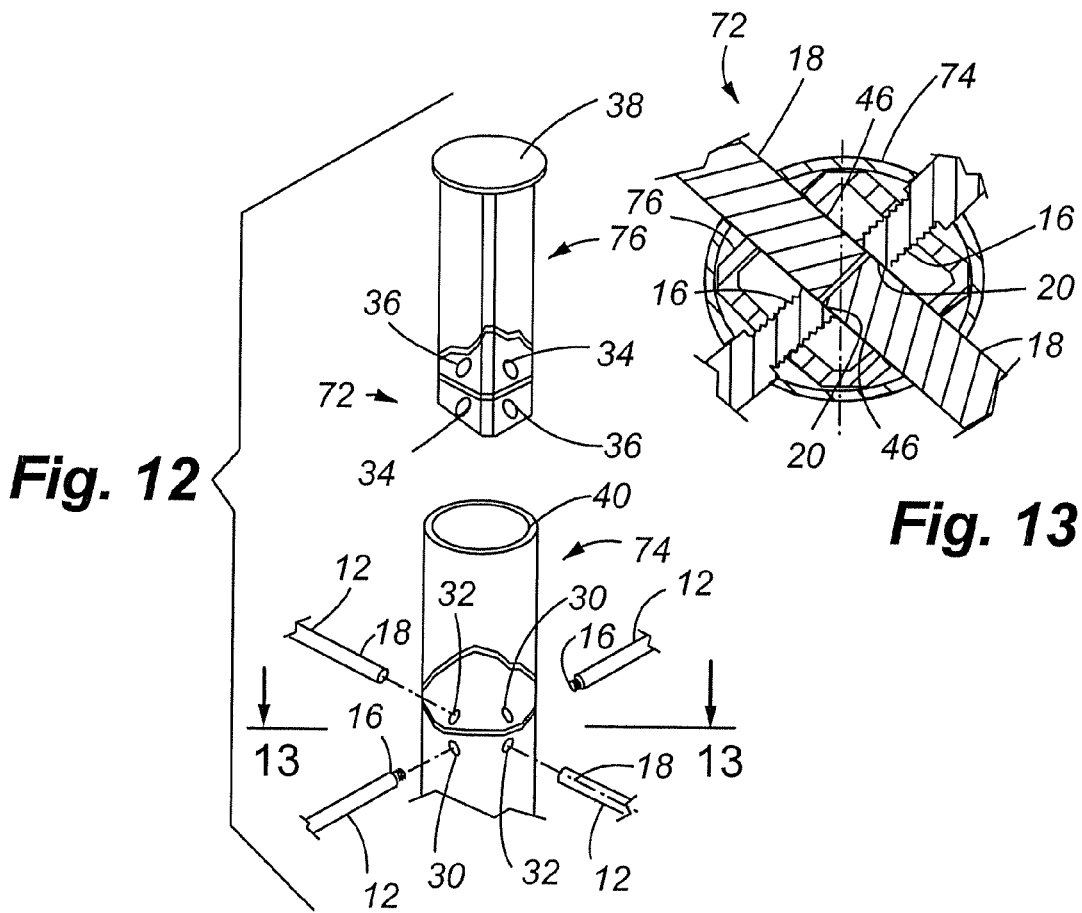
Fig. 12
Fig. 13

FURNITURE FRAMING ASSEMBLY AND METHOD OF USE

CROSS REFERENCE TO RELATED APPLICATION

The present application is a continuation of U.S. patent application Ser. No. 10/796,684, filed Mar. 8, 2004, now U.S. Pat. No. 7,082,734, which claimed the benefit of U.S. Provisional Patent Application No. 60/452,851, filed Mar. 7, 2003. The above-noted applications are incorporated herein by reference in their entirety.

FIELD OF THE INVENTION

The present invention relates generally to a framing assembly, and a method of assembly related thereto. The framing assembly and connections described herein can be used to construct buildings and/or any other type of device or structure. The present invention has particular application to furniture and furniture assemblies.

BACKGROUND OF THE INVENTION

Existing furniture framing assemblies typically utilize at least one hardware item, such as a nail, screw, nit or bolt at a corner position or at a connection point, thereby requiring the person assembling the furniture item to utilize some type of tool to assembly the item. Therefore, the person assembling the furniture must find a proper tool to perform the assembly. A more frustrating case exists where the furniture item to be assembled is packaged with one or more missing hardware components. For example, many people have faced the frustration associated with buying a disassembled furniture item, only to find that it is missing hardware, such as a screw, bolt, or nut, and have had to either find a substitute hardware piece or return the furniture item to the retailer for a refund or replacement. Accordingly, there is a need for an assembly whose component pieces can be assembled by a person without having to resort to finding a tool that fits a specific screw or bolt that comes with the assembly, or otherwise find a substitute piece of hardware for a missing piece.

In view of the above, there is a long felt but unsolved need for furniture connection devices and methods for the same that avoid the above-mentioned deficiencies of the prior art and that are versatile in potential uses while being relatively simple to assemble.

SUMMARY OF THE INVENTION

The present invention solves the above mention deficiencies by providing an assembly that utilizes rods and connecting members that can be assembled without the person performing the assembly having to resort to using tools or hardware. The rods of the present invention preferably seat against each other within the connection members, without external connections, without using a separate tightening device, and without welding during assembly. It is therefore an aspect of the present to provide a connection for a framing assembly, wherein the connection includes at least two lateral members, rods, or poles, with one of the lateral members, rods or poles applying a force to the other lateral member, rod or pole after assembly.

Thus, in one aspect of the invention, an assembly for forming furniture framing is provided, the assembly comprising a plurality of lateral members or rods, where each lateral member includes a threaded end and an unthreaded end. In addition, the assembly includes a plurality of connection members, wherein each connection member comprises an interior member and an exterior member. Each of the interior members includes a threaded aperture for threadably receiving the threaded end of one of the lateral members and an unthreaded aperture for slidably receiving the unthreaded end of an other of the lateral members. The exterior members include a first aperture sized to receive the threaded end of the one of the lateral members and a second aperture sized to receive the unthreaded end of the other of the lateral members, wherein the first aperture of the exterior member is substantially aligned with the threaded aperture of the interior member, and wherein the second aperture of the exterior member is substantially aligned with the unthreaded aperture of the interior member. Upon assembly, a distal surface of the threaded end of each of the lateral members abuts a circumferential surface of the unthreaded end of another of the lateral members. The lateral members are tightened against one another within the connector members to form the furniture framing.

One embodiment of the present invention comprises four rods and four connection members. Thus, in one aspect of the invention, an assembly for forming furniture framing is provided, wherein the assembly comprises a first rod, a second rod, a third rod and a fourth rod, where each of the first, second, third and fourth rods includes a threaded end and an unthreaded end. In addition, the assembly includes a first corner connector including a first interior member and a first exterior member, the first interior member includes a threaded aperture for threadably receiving the threaded end of the first rod, and an unthreaded aperture for slidably receiving the unthreaded end of the second rod. Upon assembly, within the first interior member a longitudinally distal surface of the threaded end of the first rod contacts a lateral surface of the unthreaded end of the second rod, and a longitudinally distal surface of the unthreaded end of the second rod contacts a back surface of the first interior member or a back interior surface of the first exterior member. In addition, the first exterior member includes a first unthreaded aperture for slidably receiving an unthreaded portion of the first rod, wherein the unthreaded portion of the first rod is situated longitudinally proximal and adjacent the threaded end of the first rod. The first exterior member also includes a second unthreaded aperture for slidably receiving the unthreaded end of the second rod. In addition, the first interior member is situated within a perimeter surface of the first exterior member. The device includes similar structure at the second, third and fourth corner connectors, where each corner connector is connected to two adjacent rods, and wherein the entire assembly substantially forms a rectangular or square shape when fully assembled.

It is a separate aspect of the invention to provide fully interchangeable components for a square one-level assembly. More particularly, for a square one-level assembly, each of the rods are interchangeable, and each of the connection members are interchangeable.

It is a separate aspect of the present invention to provide a method of assembling the framing assembly device. Thus, in one aspect of the invention, a method is provided for assembling furniture framing, the method comprising the steps of inserting an unthreaded end of a first rod into a first unthreaded aperture of an exterior member of a first connection member and through an unthreaded aperture of an interior member of the first connection member. The method also includes the step of inserting a threaded end of a second rod into a second unthreaded aperture of the exterior member of the first connection member and rotating the second rod to thread the second rod into a threaded aperture of the interior member of the first connection member, wherein a distal surface of the threaded end of the second rod abuts a circumferential surface of the unthreaded end of the first rod. The method then includes the step of inserting an unthreaded end of a third rod into a first unthreaded aperture of an exterior member of a second connection member and through an unthreaded aperture of an interior member of the second connection member, and inserting a threaded end of the first rod into a second unthreaded aperture of the exterior member of the second connection member and rotating the first rod to thread the first rod into a threaded aperture of the interior member of the second connection member, wherein a distal surface of the threaded end of the first rod abuts a circumferential surface of the unthreaded end of the third rod. Next, the method includes inserting an unthreaded end of a fourth rod into a first unthreaded aperture of an exterior member of a third connection member and through an unthreaded aperture of an interior member of the third connection member, and inserting a threaded end of the third rod into a second unthreaded aperture of the exterior member of the third connection member and rotating the third rod to thread the third rod into a threaded aperture of the interior member of the third connection member, wherein a distal surface of the threaded end of the third rod abuts a circumferential surface of the unthreaded end of the fourth rod. The method then includes the step of inserting an unthreaded end of the second rod into a first unthreaded aperture of an exterior member of a fourth connection member and through an unthreaded aperture of an interior member of the fourth connection member, and inserting a threaded end of the fourth rod into a second unthreaded aperture of the exterior member of the fourth connection member and rotating the fourth rod to thread the fourth rod into a threaded aperture of the interior member of the fourth connection member, wherein a distal surface of the threaded end of the fourth rod abuts a circumferential surface of the unthreaded end of the second rod. An additional step comprises tightening each of the first, second, third and fourth rods.

In a separate aspect of the invention, a connection assembly is provided, the connection assembly comprising a first rod having an unthreaded end and a connector having an aperture sized to slidably receive the unthreaded end of the first rod. In addition, the connection assembly includes a second rod threadably received by the connector, wherein upon assembly, the second rod induces a force to secure the first rod within the connector. The connection assembly may further comprise a third rod having an unthreaded end, the connector having another aperture for slidably receiving the third rod, wherein the first and third rods substantially occupy the same elevation, and wherein the second rod induces a force to secure the third rod within the connector.

It is a separate aspect of the present invention to provide an assembly that does not require hardware to assemble.

It is a separate aspect of the present invention to provide an assembly that can be sequentially assembled and tightened.

It is a separate aspect of the present invention to provide an assembly that can be disassembled for volume reduction during shipping.

It is a separate aspect of the invention to provide an assembly that can be used for a variety of types of furniture, such as tables, bookcases, and shelving units, as well as pieces of furniture that include panels enclosing the framing, to include casegoods such as cabinets, entertainment centers, bars, chests, and stationary and mobile armoires, to name but a few. Items incorporating the present invention can be structured in a multi-tiered arrangement, where each level of rods substantially forms a plane to receive a shelf, drawer unit, or hanging rod.

Various embodiments of the present invention are set forth in the attached figures and in the detailed description of the invention as provided herein and as embodied by the claims. It should be understood, however, that this Summary of the Invention may not contain all of the aspects and embodiments of the present invention, is not meant to be limiting or restrictive in any manner, and that the invention as disclosed herein is and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

FIG. 1 is a perspective view of one embodiment of the present invention;

FIG. 2 is an exploded perspective view of one connection member and two adjacent rods of the assembly shown in FIG. 1;

FIG. 2A is a perspective view of a modified version of the interior member shown in FIG. 2;

FIG. 2B is a cross-sectional view of the device shown in FIG. 2A taken along line 2B-2B;

FIG. 8 is an exploded elevation view of a modified embodiment of a connection member;

FIG. 9 is a perspective view of one example of an alternate embodiment of the present invention that includes a plurality of levels of rods;

FIG. 10 is an exploded perspective view of the telescoping feature of the connection members shown in FIG. 9;

FIG. 11 is a perspective view of an alternate embodiment of the present invention that includes connection members for adding adjacent assembly portions;

FIG. 12 is an exploded perspective view with a partial cut-away portion of a connection member of FIG. 11 having four rods interconnected thereto;

FIG. 13 is a cross sectional view of the connection member of FIG. 12 taken along line 13-13 of FIG. 12 after being fully assembled;

Figure 3:
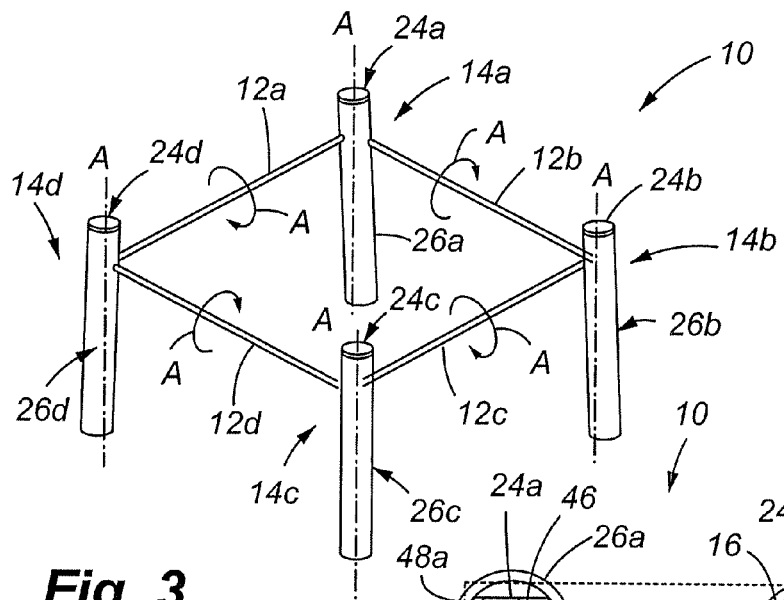
FIG. 3 is a perspective view of the device shown in FIG. 1 depicting a possible status of the assembly during the assembling effort.

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication.

DETAILED DESCRIPTION

Referring now to FIG. 1, a perspective view of one embodiment of a furniture framing assembly 10 of the present invention is shown. The framing assembly 10 includes a plurality of lateral members or rods 12a-d interconnected with connection members 14a-d. The present invention can be used to create framing for a variety of structures, such as a table, shelving unit, chest, armoire, etc., and framing assembly 10 has particular application to creating framing for a table, but is also representative of how the connections function for multi-tiered framing assemblies, which will be discussed in more detail below.

Referring now to FIG. 2, connection member 14a is shown in combination with rods 12a and 12b. It should be noted that, for the framing assembly 10 shown in FIG. 1, connection members 14a-d are substantially identical in structure, as are rods 12a-d. Thus, FIG. 2 is representative of any one connection member 14a-d shown in FIG. 1, together with two adjacent rods. Rods 12a and 12b each include a threaded end 16 and an unthreaded end 18. The threaded end 16 includes a longitudinally distal surface 20. Similarly, the unthreaded end 18 also preferably includes a longitudinally distal surface 22.

Referring still to FIG. 2, connection member 14a includes two portions, an interior member 24a and an exterior member 26a, where exterior member 26a is a vertical member, and wherein exterior member 26a acts as a leg or post for the framing assembly 10. Exterior member 26a includes a perimeter surface 28a, and upon assembling framing assembly 10, interior member 24a is located inside the perimeter surface 28a of exterior member 26a. Exterior member 26a also includes two apertures through its perimeter surface 28a, including a first unthreaded aperture 30 for receiving the threaded end 16 of rod 12a, and a second unthreaded aperture 32 for receiving the unthreaded end of rod 12b. The first unthreaded aperture 30 is sized to have the threaded end 16 of rod 12a slid therethrough. More particularly, the first unthreaded aperture 30 is sized to be just slightly larger than the diameter of rod 12a along its unthreaded portion, where an unthreaded portion 17 of rod 12a is situated longitudinally proximal and adjacent the threaded end 16 of rod 12a. The second unthreaded aperture 32 is substantially the same size as the first unthreaded aperture 30, and therefore, is also just slightly larger than the diameter of rod 12b along its unthreaded portion.

Interior member 24a preferably includes two openings for receiving rods 12a and 12b. Threaded aperture 34 is sized to threadably receive the threaded end 16 of rod 12a, and unthreaded aperture 36 is sized to slidably receive the unthreaded end of 18 of rod 12b. In addition, once the interior member 24a is placed inside the exterior member 26a of connection member 14a, the unthreaded aperture 30 of exterior member 26a is oriented to substantially align with the threaded aperture 34 of interior member 24a, and the unthreaded aperture 32 of exterior member 26a is oriented to substantially align with the unthreaded aperture 36 of interior member 24a. As shown in FIG. 2, in one embodiment, interior member 24a preferably includes a cap piece 38a that is sized to fit over the top surface 40 of exterior member 26a. In an alternate configuration (not shown), projections or an alternate structure may be used in place of the cap piece 38. The length Li of the interior member 24a between the cap piece 38a and the threaded aperture 34 and unthreaded aperture 36 is substantially equal to the length Le of the exterior member 26a between its top surface 40 and the unthreaded apertures 30 and 32 along its perimeter surface 28a.

One particular advantage of the present invention is that it allows the apertures 30 and 32 to be manufactured in very close tolerance to the size of the rods 12a-d being received therein. This has considerable visual appeal to the observer of the assembly. In addition, because the threaded end 16 of the rod is being interconnected to the interior member 24a-d, threads are not visible after assembly because they are hidden by the exterior member 26a-d, and this too is visually appealing because it is not apparent as to how the connection is made. Furthermore, such close tolerances allow the assemblies of the present invention to be used in medical or food service uses.

The framing assembly 10 shown in FIG. 1 includes rods 12a-d and connection members 14a-d that form a substantially square foot print. Thus, one aspect and advantage to the framing assembly 10 is that all of the rods 12a-d are interchangeable because they are all substantially identical, and all of the connection members 14a-d are interchangeable because they are also substantially identical.

Preferably, unthreaded apertures 30 and 32 of exterior member 26a are separated from each other by an arc angle of about 90 degrees, as are threaded aperture 34 and unthreaded aperture 36 of interior member 24a. The interior members 24a-d can be a variety of shapes in cross section. The interior member 24a shown in FIG. 2 (and also shown in FIGS. 4-6 in cross section) is a four-sided member. Alternatively, the interior member 24a' shown in FIGS. 2A and 2B is a two-sided member, such as an angle iron, where threaded aperture 34 is located along a first surface 42, which is situated at about a 90 degree angle from a second surface 44 that has the unthreaded aperture 36 along its surface. Accordingly, the interior members 24a-d can take on a variety of shapes, provided that the apertures are oriented to allow the rods to enter substantially perpendicular to each other, or at substantially 90 degrees relative to each other. Therefore, as a further example, the interior members 24a-d can each be formed of a single flat section of material (not shown), where the apertures 34 and 36 are obliquely positioned to the surface of the material, but which also allow the rods to be placed therein to be oriented substantially perpendicular to one another.

FIG. 2A further illustrates that the unthreaded aperture 36 may take the form of an elongated slot as opposed to an opening shaped to substantially match the cross section of the rod it is receiving. For the example of the modified interior member 24a' shown in FIG. 2A, the unthreaded aperture 36 is a slot that occupies a substantial length of the second surface 44 of the interior member 24a'.

In the preferred embodiment shown in FIG. 1, the rods 12a-d are substantially circular in cross section. However, the rods 12a-d can have an alternative shaped cross section, or can have portions that are shaped differently along their length. For example, a portion of the unthreaded end 18 can be polygonal in cross section (not shown), including being six sided, twelve sided, or twenty-four sided. Such a multi-sided circumferential surface 46 provides a flat portion for contacting the distal surface 20 of the threaded end 16 of the adjacent rod.

Figure 4:
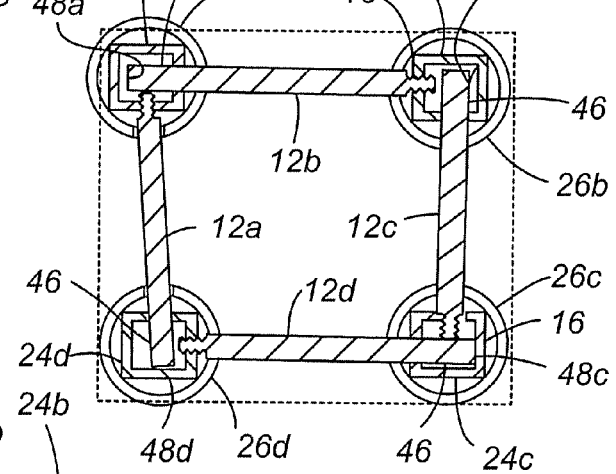
FIG. 4 is a cross sectional view of the assembly of FIG. 3 during partial assembly where all components are interconnected and only partially tightened.
Figure 5:
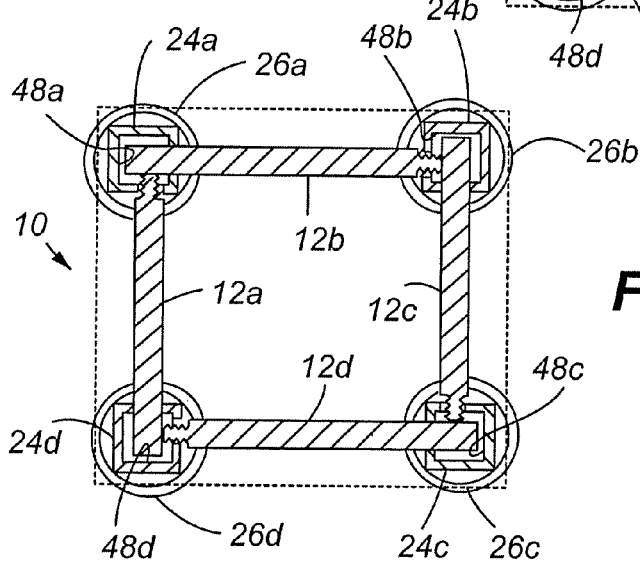
FIG. 5 is another cross sectional view of the assembly of FIG. 3 during partial assembly where all components are interconnected and partially tightened but not fully tightened.

Referring now to FIGS. 3-5, the various components of the framing assembly 10 are shown being assembled. Initially, an interior member 24*a* is inserted into exterior member 26*a* and the apertures 30 and 32 of the exterior member 26*a* are aligned with the apertures 34 and 36 of interior member 24*a*. The unthreaded end 18 of rod 12*b* is inserted into unthreaded aperture 32 of exterior member 26*a* and unthreaded aperture 36 of interior member 24*a*. Rod 12*a* is then slid through unthreaded aperture 30 of exterior member 26*a* and partially threaded into threaded aperture 34 of interior member 24*a*. This process is then repeated sequentially for connection members 14*b*, 14*c*, and 14*d*. Considering connection member 14*b* first, the unthreaded end 18 of rod 12*c* is inserted into unthreaded aperture 32 of exterior member 26*b* and unthreaded aperture 36 of interior member 24*b*. Rod 12*b* is then slid through unthreaded aperture 30 of exterior member 26*b* and partially threaded into threaded aperture 34 of interior member 24*b*. Then connection member 14*c* is assembled and the unthreaded end 18 of rod 12*d* is inserted into unthreaded aperture 32 of exterior member 26*c* and unthreaded aperture 36 of interior member 24*c*. Rod 12*c* is then slid through unthreaded aperture 30 of exterior member 26*c* and partially threaded into threaded aperture 34 of interior member 24*c*. Finally, connection member 14*d* is assembled and the unthreaded end 18 of rod 12*a* is inserted into unthreaded aperture 32 of exterior member 26*d* and unthreaded aperture 36 of interior member 24*d*. Rod 12*d* is then slid through unthreaded aperture 30 of exterior member 26*d* and partially threaded into threaded aperture 34 of interior member 24*d*.

One advantage of the present invention is that it can be assembled without the use of tools. That is, there are no nuts, no screws and no bolts to be tightened, nor any nails to be hammered. Thus, the framing assemblies of the present invention can put together by the user without the user having to employ a single tool. However, although not required, tools can be used, and if desired, a tool can be used to assist in grasping the rods and rotating them during assembly. For example, depending upon the tightness desired and the arm strength of the person working on the assembly, a user of the assembly may wish to employ and aid, such as a rubber or plastic pad to be held in the palm of the hand and applied to the rod surface during turning. In addition, although not required, additional set screws (not shown) or a variety of other types of securing devices could be used to provide additional securing capability to the assembly, such as when the assembly is intended to be used in a public location. However, such set screws or additional securing devices are not required to assemble a stable skeletal frame, such as for a table or a chest.

FIG. 4 depicts a cross section of a possible state of the assembly 10 after it is initially started where none of the rods 12*a-d* are tight within the connection members 14*a-d*. After some additional tightening by rotating the rods 12*a-d* in accordance with the arrows A shown in FIG. 3, the distal surfaces 20 of the threaded ends 16 of the rods 12*a-d* start to contact the circumferential surfaces 46 of the unthreaded ends 18 of the rods 12*a-d*. The distal surfaces 20 of threaded ends 16 are preferably substantially flat or planar for contacting the circumferential surfaces 46 of the unthreaded ends 18 of the rods 12*a-d*. In a sense, the distal surfaces 20 of the threaded ends 16 of rods 12*a-d* act as an over-sized set screw to provide a force against the adjacent rod. In addition, for the four sided interior members 24*a-d* shown in FIGS. 4 and 5, during initial and gradual tightening of the assembly 10, the distal surfaces 22 of the unthreaded ends 18 of rods 12*a-d* are pushed to contact an interior back surface 48*a-d* of the interior members 24*a-d*. Alternatively, if only a two side interior member 24 is used, such as that shown in FIGS. 2A and 2B, then the distal surfaces 22 of the unthreaded ends 18 of rods 12*a-d* are pushed to contact an interior back surface 50*a-d* of the exterior members 26*a-d*.

Preferably, the assembly 10 is gradually and sequentially tightened. More particularly, the assembly 10 may be tightened in a manner similar to tightening the lug nuts on a car tire where one nut is tightened and then an opposite nut is tightened. For assembly 10 shown in FIGS. 3-5, this may entail partially tightening rod 12*a* at connection member 14*a*, followed by partially tightening rod 12*c* at connection member 14*c*, rod 12*b* at connection member 14*b*, and then rod 12*d* at connection member 14*d*, and then back to rod 12*a* at connection member 14*a*. Alternatively, the sequence of gradual and partial tightening may simply be in a clockwise or counterclockwise direction around the assembly 10. Whatever the order used, the preferred method is one of gradual tightening so that the assembly 10 is substantially aligned with 90 degree angles between adjacent rods when fully tightened.

Figure 7:
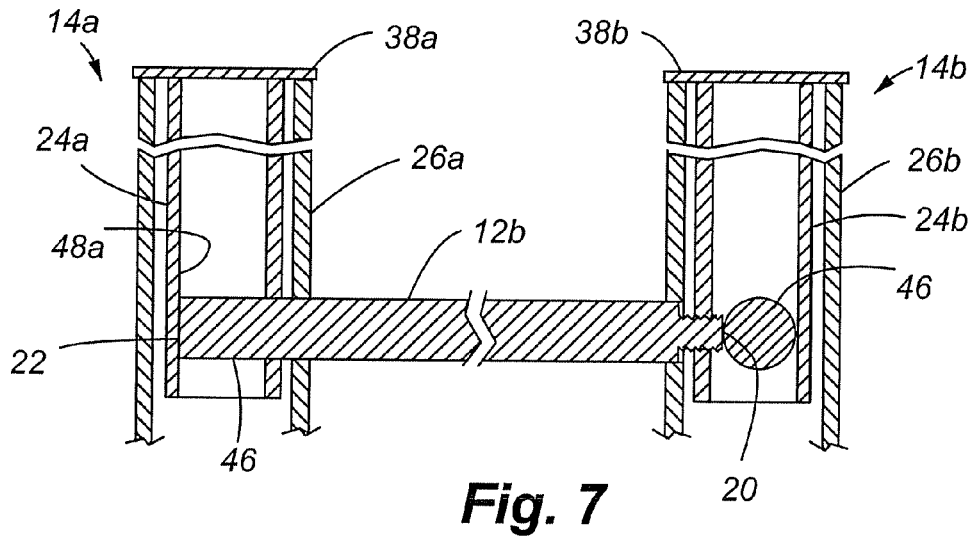
FIG. 7 is a cross sectional view taken along line 7-7 of FIG. 6.
Figure 6:
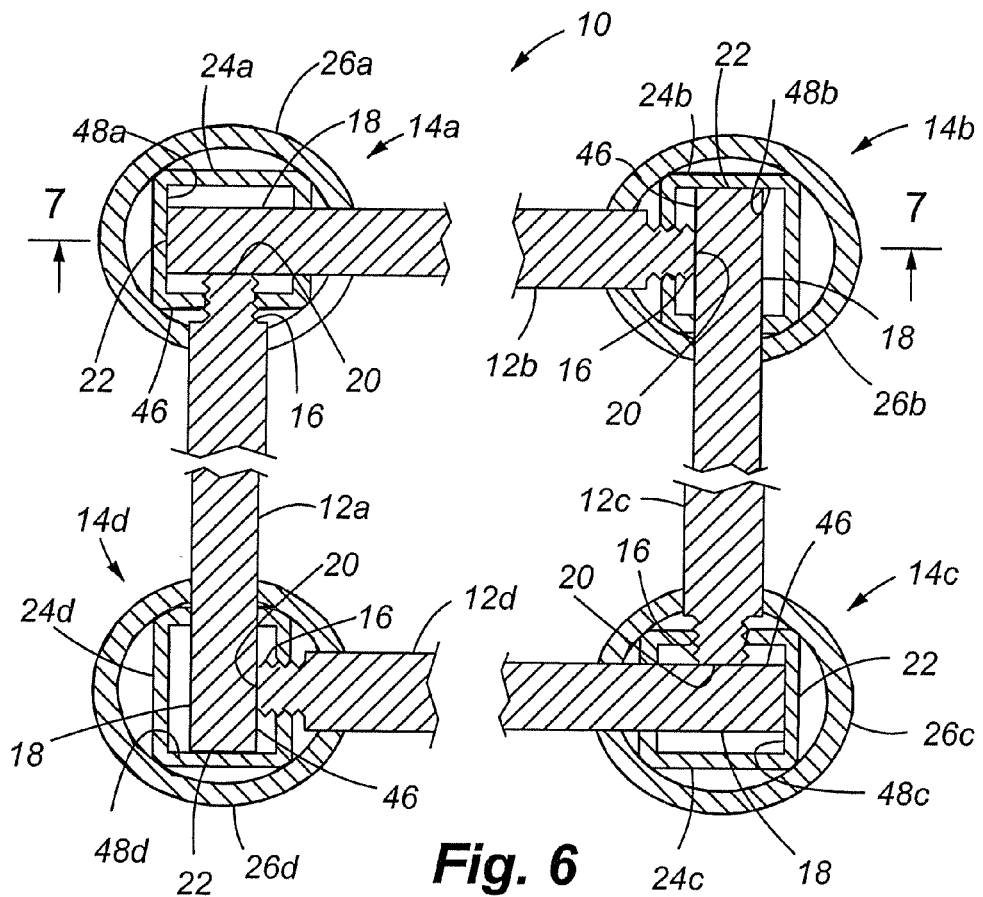
FIG. 6 is a cross sectional view of the assembly of FIG. 3 after full assembly where all components are interconnected and are fully tightened.

Referring now to FIGS. 6 and 7, the assembly 10 is shown in a fully tightened configuration. More particularly, the distal surface 20 of the threaded end 16 of each rod 12*a-d* is substantially evenly contacting the circumferential surface 46 of the unthreaded ends 18 of rods 12*a-d*. In addition, the distal surfaces 22 of the unthreaded ends 18 of each rod 12*a-d* are substantially evenly contacting the interior back surfaces 48*a-d* of the interior members 24*a-d*.

It is a separate aspect of the present invention to provide an assembly for providing multiple levels of rods for receiving shelves or drawers or the like. A number of different means for creating a plurality of levels of framing within one structural unit are available. For example, as shown in FIG. 8, a relatively long, for example, 6-foot connection member 52 can be used, wherein the connection member 52 has a plurality of locations for receiving a series of rods. More particularly, the connection member 52 may include a single exterior member 54 and a single interior member 56, where the interior member 56 is preferably less than or equal to the length of the exterior member 54, and where the interior member 56 includes apertures 34, 36 at multiple elevations to correspond to apertures 30, 32 in the exterior member 54. Such connections members are then combined with multiple sets of rods to create a multi-tiered structure. Alternatively, a single connection member for a multi-tiered structure can include a single exterior member and two or more interior members (not shown). For example, for two interior members associated with one exterior member, one interior member can be inserted from the top of the exterior member and the other inserted from the bottom of the exterior member. Thus, a variety of configurations are available for creating framing assemblies with multiple levels of rods for receiving shelving or drawers, etc.

Referring now to FIGS. 9 and 10, in a separate embodiment of the invention, a framing assembly 10' is shown that includes a plurality of levels. More particularly, for the example of the framing assembly 10' shown in FIG. 9, a multi-tiered assembly is illustrated that includes a plurality of stacked levels of framing. Framing assembly 10' includes at least two levels, including a first level 58.1 and a second level 58.2. It is to be understood that the present invention lends itself to for receiving shelves and/or drawers over the rods that are interconnected to the connection members. For the first level 58.1, the connection members 60.1a-60.1d include interior members 62.1a-62.1d and exterior members 64.1a-64.1d. Each interior member 62.1a-62.1d preferably includes two apertures, including a threaded aperture 34 and an unthreaded aperture 36, where apertures 34 and 36 are preferably offset at about 90 degrees to each other. Each exterior member 64.1a-64.1d preferably includes two unthreaded apertures 30 and 32 that slidably receive the rods 12.1a-12.1d, where the apertures are also preferably offset at about 90 degrees to each other. The second level 58.2 and any additional levels preferably include substantially the same components as those described for the first level 58.1.

For framing assembly 10', a rectangular shaped structure is shown, where rods 12.1a and 12.1c, which are parallel to each other and substantially equal in length, are of a different length than rods 12.1b and 12.1d, which are also parallel to each other and are also substantially equal in length. Thus, the framing assemblies of the present invention may take on a substantially square or rectangular footprint.

Referring still to FIGS. 9 and 10, the interior members 62.1a-62.1d preferably include a cap piece 38.1a-38.1d. Similar to framing assembly 10 shown in FIG. 1, the interior members 62.1a-62.1d preferably are slidably received within the exterior members 64.1a-64.1d of framing assembly 10', where cap piece 38.1a-38.1d fits over the top surface 40 of its respective exterior member 64.1a-64.1d. In addition, the interior members 62.1a-62.1d preferably include a means for interconnecting the first lever 58.1 to the second level 58.2. For the embodiment shown in FIGS. 9 and 10, a telescoping-type of connection is provided, wherein the cap piece 38.1a-38.1d includes a male portion 66 to be inserted into the female portion 68 of the exterior member 64.2a-64.2d. Such structure is advantageous because the components of the framing assembly 10' are interchangeable and stackable.

In another aspect of the invention, a multi-piece framing assembly 10" is provided as shown in FIGS. 11-13. The multi-piece framing assembly 10" includes some connection members that have more than two rods connected therein. For example, the assembly 10" may include connection members 70 that have three rods interconnected therein, and the assembly 10" may further include connection members 72 that have four rods interconnected therein. FIGS. 12 and 13 illustrate a connection member 72, wherein the exterior member 74 includes four apertures 30, 30, 32, and 32 for receiving the rods 12, and the interior member 76 also includes four apertures 34, 34, 36 and 36 for threadably and slidably receiving the rods 12. For the assembly 10", the length of the rods is not substantially equal because the rods 12 within the connection members 70 and 72 do not extend to the interior back surface of the interior member.

Figure 14:
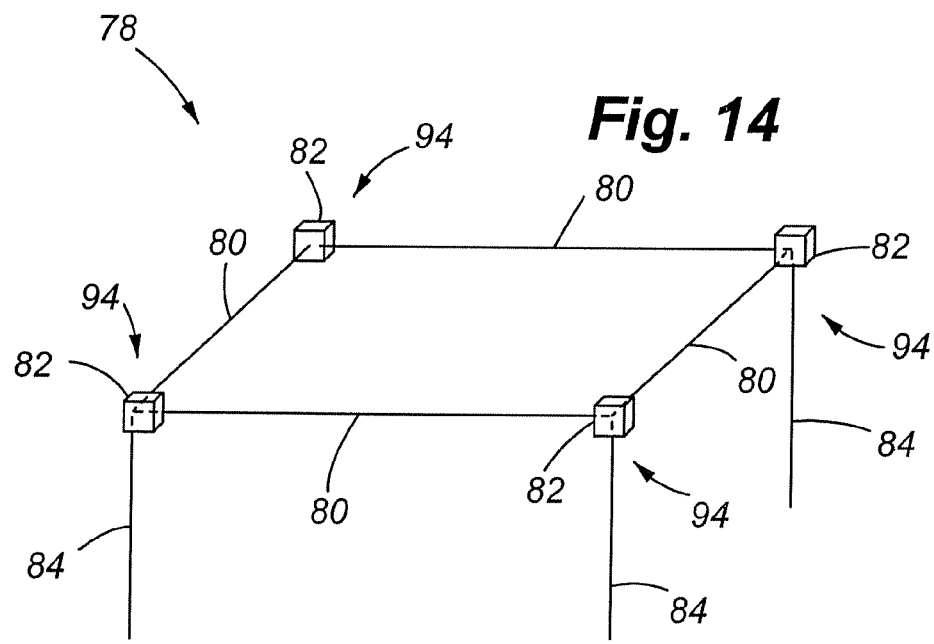
FIG. 14 is a perspective view of another embodiment of the present invention.

Referring now to FIG. 14, an alternate embodiment of the present invention is illustrated. Framing assembly 78 features an alternate configuration for interconnecting a framing assembly. Framing assembly 78 includes a plurality of rods 80, a plurality of connectors 82, and a plurality of legs or poles 84, where these components are secured by threading one of the poles 84 into one the connectors 82, and thereby applying a securing force to the interconnecting rods 80.

Figure 15:
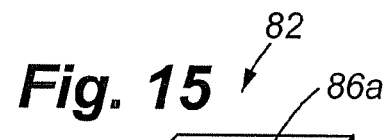
FIG. 15 is a perspective view of one possible connector for use in the assembly shown in FIG. 14.

Referring now to FIG. 15, connector 82 preferably includes first and second apertures 86a-b for slidably receiving ends 88 of the two rods 80. Connector 82 also includes a threaded aperture 90 for threadably receiving a threaded end 92 of a pole 84.

Figure 16:
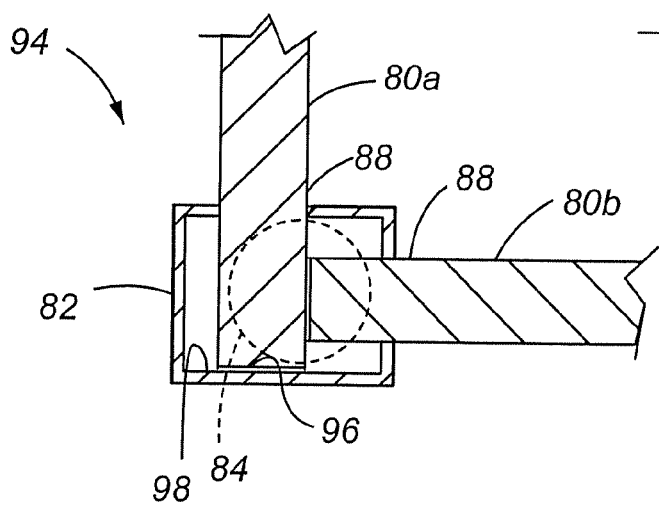
FIG. 16 is a cross sectional view of the connector of FIG. 15 taken along line 16-16 of FIG. 15, with two rods a pole shown in position within the connector.
Figure 17:
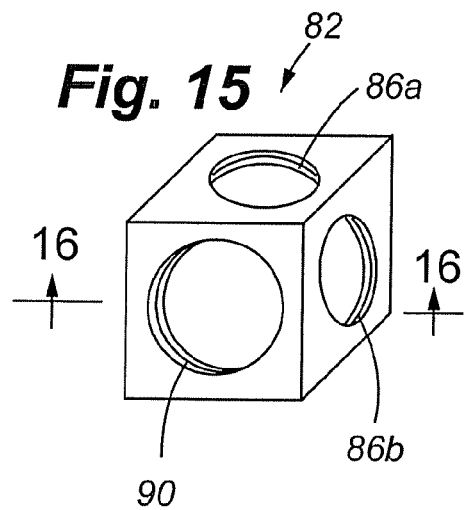
FIG. 17 is an elevation view of a pole used in the assembly of FIG. 14.

Referring now to FIG. 16, a connection assembly 94 is illustrated. Connection assembly 94 includes a connector 82, two rods 80, and a pole 84. In use, a first of the two rods 80a is inserted into a first of the two apertures 86a, and then a second of the two rods 80b is inserted into the second of two apertures 86b and also against the first rod 80a. Preferably, the first rod 80a has a distal surface 96 of an end 88 contacting an inside surface 98 of the connector 82. After rods 80a and 80b are inserted within connector 82, the pole 84 is threaded into threaded aperture 90 of connector 82, and advanced until it applies a securing force to rods 80a and 80b. As shown in FIG. 17, pole 84 includes a threaded end 92 and a distal surface 20. When securing rods 80a and 80b within connector 82, distal surface 20 of pole 84 contacts rods 80a and 80b. Alternatively, distal surface 20 of rod 84 may contact a plate or pad (not shown) within connector 82, which in turn applies a securing force to rods 80a and 80b.

One advantage of the framing assemblies described herein is that all of the components can be manufactured and shipped disassembled for ease and reduced shipping volume. Upon delivery to the ultimate end user, the end user can easily assemble the frame without tools. Accordingly, the present invention has application to such end uses as normal furniture framing used in residences and offices, as well as portable camping gear, military equipment, and presentation or event equipment, such as at a business or political convention.

In yet a separate aspect of the invention, the perimeter surface of the exterior members may include slots, grooves and/or other attachment means (not shown) to receive a sheet of material with or without a laminate to serve as a decorative veneer or facade, and/or to provide a means for enclosing at least a portion of the skeletal framing. In addition, the exterior members may have a variety of shapes. More particularly, the exterior members can be circular, rectangular, square or multi-sided is cross section. The various components of the framing assemblies can be manufactured of a variety of materials, including metals such as steel, stainless steel, aluminum, copper, titanium, and alloys of various metals, as wells as other materials such as plastics, composites, ceramics, wood, and glass. In addition, rods and exterior members can include a variety of finishes, such as a painted surface, polished metal, powder coated metal, texturing, natural wood, etc.

In one preferred embodiment, the interior member and exterior member form one integral piece. That is, during manufacture, the interior member is permanently attached to the exterior member, such as by welding. This unitary connection member arrangement has particular application for devices such as a table, where stacking of assemblies is not applicable.

One advantage of the present invention is that it possesses the ability to be easily assembled and disassembled. A separate advantage is that there is no external connecting hardware that is apparent, including no apparent screw heads or bolts etc. Therefore, the present invention has great visual appeal. A separate advantage is that the present invention does not require any tools to be assembled. Yet a separate advantage is that other than the component parts, there are no additional pieces, including no hardware.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. An assembly for forming framing, the assembly comprising:
   a plurality of lateral members, each lateral member including a threaded end and an unthreaded end;
   a plurality of connection members, each connection member comprising a threaded aperture for threadably receiving the threaded end of one of said lateral members and an unthreaded aperture for slidably receiving the unthreaded end of another of said lateral members;
   wherein upon assembly, a distal surface of said threaded end of each of said lateral members abuts a circumferential surface of said unthreaded end of another of said lateral members, and wherein said lateral members are tightened against one another within said connection members to form the framing.

2. The assembly as claimed in claim 1, wherein said plurality of connection members comprises four connection members.

3. The assembly as claimed in claim 1, wherein upon assembly, each of said lateral members is substantially parallel to another of said lateral members, and wherein each of said lateral members is situated at an angle of about 90 degrees to two other of said lateral members.

4. The assembly as claimed in claim 1, wherein said lateral members have a substantially circular cross section.

5. The assembly as claimed in claim 1, wherein said unthreaded apertures of said interior members comprise slots.

6. The assembly as claimed in claim 1, wherein said unthreaded apertures of said interior members comprise circular openings.

7. The assembly as claimed in claim 1, wherein said plurality of lateral members are substantially equal in length.

8. The assembly as claimed in claim 1, wherein said plurality of lateral members are substantially identical in structure, and wherein said plurality of connection members are substantially identical in structure.

9. The assembly as claimed in claim 1, wherein said plurality of lateral members comprises a first set of four rods.

10. The assembly as claimed in claim 9, wherein said first set of four rods are substantially equal in length.

11. The assembly as claimed in claim 9, wherein a first subset of two rods of said first set of four rods are substantially equal in length, and a second subset of two rods of said first set of four rods are substantially equal in length, and wherein said first subset of two rods is different in length than said second subset of two rods.

12. The assembly as claimed in claim 11, wherein a first rod of said first subset of two rods is substantially parallel and opposite to a second rod of said first subset of two rods, and wherein a first rod of said second subset of two rods is substantially parallel and opposite to a second rod of said second subset of two rods.

13. The assembly as claimed in claim 9, further comprising at least a second set of four rods at a different elevation than said first set of four rods.

\* \* \* \* \*